United States Patent [19]
Dobler

[11] Patent Number: 5,702,174
[45] Date of Patent: Dec. 30, 1997

[54] ILLUMINATION DEVICE ARRANGED IN FRONT PART OF VEHICLE

[75] Inventor: Karl-Otto Dobler, Reutlingen, Germany

[73] Assignee: Robert Bosch GmbH, Stuttgart, Germany

[21] Appl. No.: 573,248

[22] Filed: Dec. 15, 1995

[30] Foreign Application Priority Data

Dec. 20, 1994 [DE] Germany .................... 44 45 272.1

[51] Int. Cl.$^6$ ...................................... B60Q 1/04
[52] U.S. Cl. .................... 362/80; 362/226; 362/269
[58] Field of Search ..................... 362/80, 226, 269, 362/365, 368, 287, 427, 228

[56] References Cited

U.S. PATENT DOCUMENTS

| | | | |
|---|---|---|---|
| 2,253,616 | 8/1941 | Falge | 362/226 |
| 4,475,148 | 10/1984 | Tomforde | 362/80 |
| 4,722,032 | 1/1988 | Kulka | 362/365 |

FOREIGN PATENT DOCUMENTS

| | | | |
|---|---|---|---|
| 3030427 | 12/1980 | Germany . | |
| 1422240 | 1/1976 | United Kingdom | 362/228 |

Primary Examiner—Y My Quach
Attorney, Agent, or Firm—Michael J. Striker

[57] ABSTRACT

The illumination device is formed as a headlight and has a frame-shaped housing part with a light outlet opening closed by a light permeable cover disc and with a reflector supported in the housing part and provided with a light source. The housing part is supported on the front part of the vehicle turnably about an axis and mountable on the front part by a releasable mounting element. It is open at its rear side and has there a circumferential edge abutting against a circumferential edge of a front part portion with interposition of a sealing element. The circumferential edge encloses a depression limited by a wall and receiving the apex of the reflector with the light source. With the released mounting element, the housing part is turnable from the front part portion, so that the light source becomes accessible for an exchange. Since the housing part does not need a rear wall, it is formed simply and only a small mounting space in the longitudinal direction of the headlight is required on the front part.

6 Claims, 2 Drawing Sheets

ILLUMINATION DEVICE ARRANGED IN FRONT PART OF VEHICLE

BACKGROUND OF THE INVENTION

The present invention relates to an illumination device which is arranged in the front part of a vehicle.

Such an illumination device is disclosed for example in the German document DE 30 30 427 A1. This illumination device is formed as a headlight. It has a housing part with at least one reflector and at least one light source arranged in the housing part. The housing part has a light outlet opening provided in its front side and closed by a light permeable cover disc. The housing part is mounted on the front part of the vehicle, for example by an arresting connection. At its rear side it has an opening closeable with a separate closing part which forms a rear wall. The housing part, the cover disc and the closing part form an enclosed chamber in which the at least reflector and the at least one light source of the illumination device are arranged to protect them from dirt and moisture. The housing part with the closing part requires a great material consumption for its manufacture and also great space for its mounting on the front part, which of course is undesirable.

SUMMARY OF THE INVENTION

Accordingly, it is an object of the present invention to provide an illumination device mountable in the front part of a vehicle, which avoids the disadvantages of the prior art.

In keeping with these objects and with others which will become apparent hereinafter, one feature of the present invention resides, briefly stated, in an illumination device arranged on a front part of a vehicle, in which the housing part is formed as a frame and is open at its rear side which is opposite to the cover disc, the housing part in its position in which it is mounted on the front part abuts with a circumferential edge of its open rear side against a portion of the front part, and the front part portion has a wall arranged inside the circumferential edge of the housing part, so that a chamber is formed which is limited by the housing part, the cover disc and the wall, which chamber accommodates at least one reflector and at least one light source.

When the illumination device is designed in accordance with the present invention, it has the advantage that a low material consumption is needed for the housing part since it does not have a rear wall itself, but instead a portion of the front part serves as a rear wall. Moreover, the illumination device needs only small mounting space on the front part in the longitudinal direction.

In accordance with another feature of the present invention, the front part portion has a circumferential edge, on which the circumferential edge of the rear side of the housing part abuts, and the wall has a depression facing away from an apex of the reflector, so that the reflector apex and the light source extend in the depression when the housing part is mounted on the front part. This further reduces the material consumption for the housing part.

In accordance with a further feature of the present invention, the housing part is turnably supported in its edge region on the front part portion by at least one releasable mounting element which is eccentric to the turning axis, and mounted with its circumferential edge on the front part portion. When the mounting element is released it turns back around the turning axis from the front part portion so that the light source becomes accessible. With this construction a simple exchange of the light source is possible.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
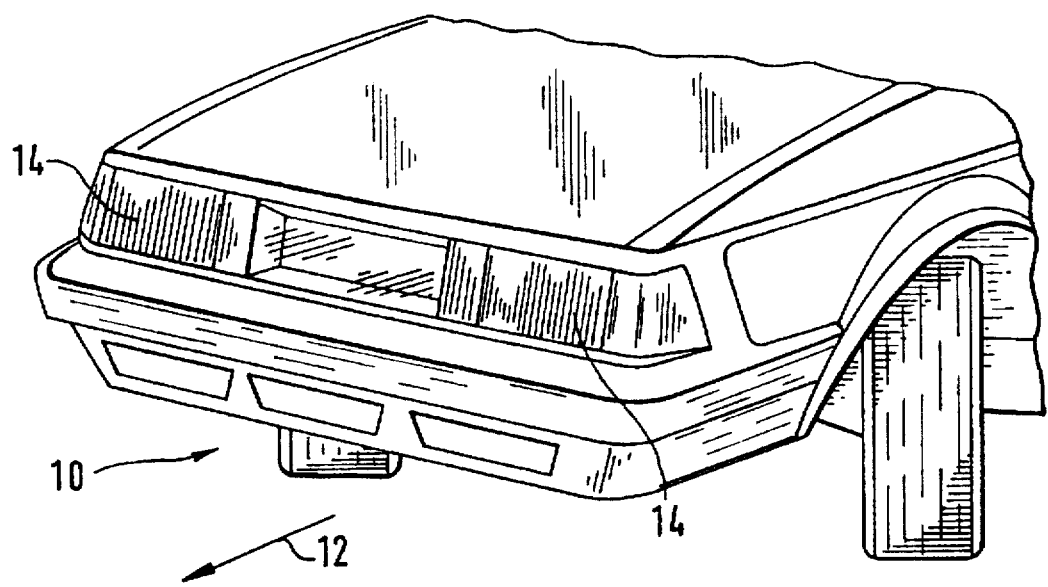
FIG. 1 is a view showing a front part of a vehicle with an illumination device arranged on it.

FIG. 1 shows a front part 10 of a vehicle, in particular a motor vehicle with an illumination device 14 arranged on its front end as considered in a traveling direction 12. The illumination device 14 is formed as a headlight or as a headlight-light unit. Also, further aggregates of the vehicle can be arranged on the front part 10. For example as conventional, on each side of the front part a headlight or a headlight-light unit 14 is arranged. The front part 10 can be composed of synthetic plastic material or of a metal sheet.

Figure 2:
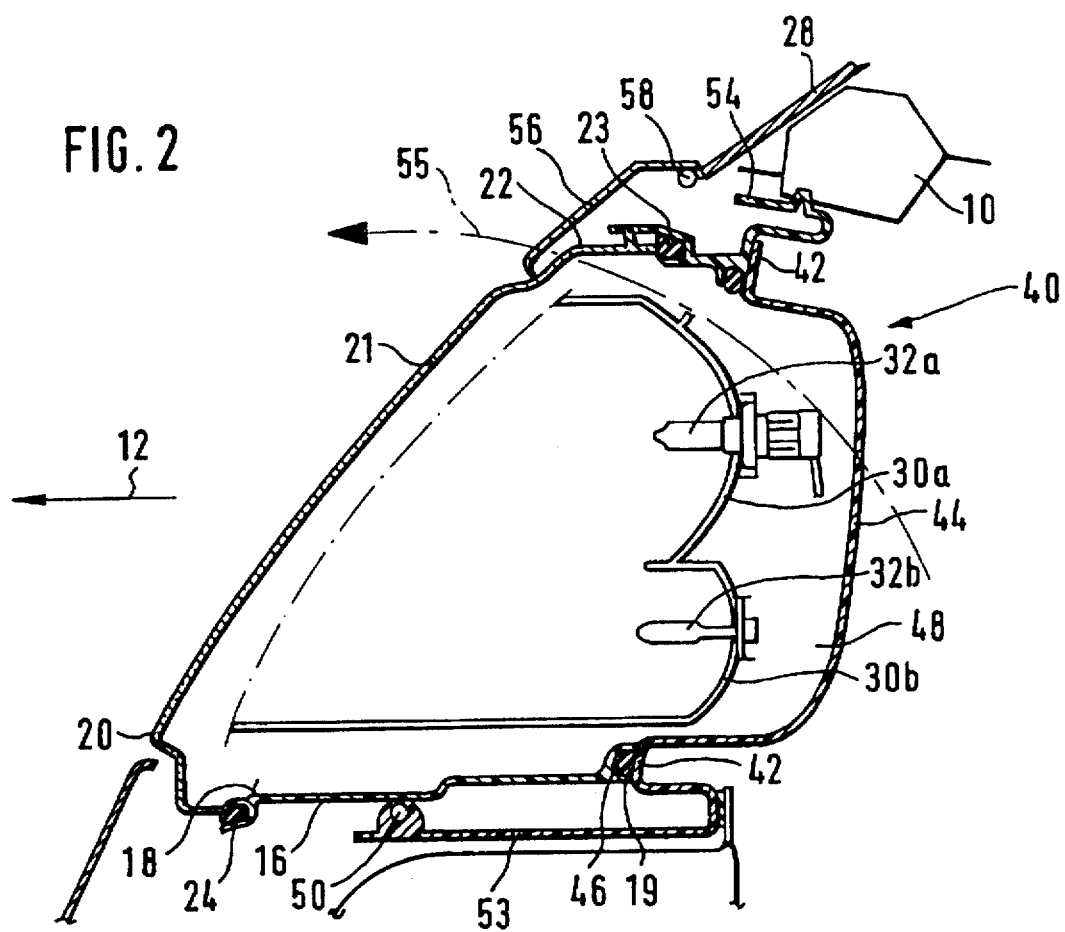
FIG. 2 is a view showing the illumination device in vertical longitudinal section in accordance with the first embodiment of the present invention.

The illumination device formed as a headlight in accordance with a first embodiment of the invention is shown in FIG. 2. The headlight 14 has a frame-like housing part 16 with a light outlet opening 18 provided on its front end as considered in the traveling direction 12. The light outlet opening is covered with a light permeable cover disc 20 composed of glass or synthetic plastic material. The housing part 16 is preferably composed of synthetic plastic material. However, it can also be composed of a different material, for example metal sheet or metal casting. The cover disc 12 can be smooth or it can be provided with optically effective elements for deviating the light passing through it.

The cover disc 20 has a main region 21 through which the light exiting the reflector passes, and also a circumferential edge 22 facing toward the housing part 16. The circumferential edge 22 is inserted into a circumferential annular groove 24 provided on the front edge of the housing part 16 with interposition of a sealing element 23. The mounting of the cover disc 20 on the housing part 16 can be performed by glueing, by one or several holding clamps, or by an arresting connection. The cover disc 20 corresponds in its inclination and/or curvature to the surrounding region of the front part 10 or a chassis 28. Therefore it extends continuously from the front part 10 and the chassis 28 in other words without steps.

Figure 4:
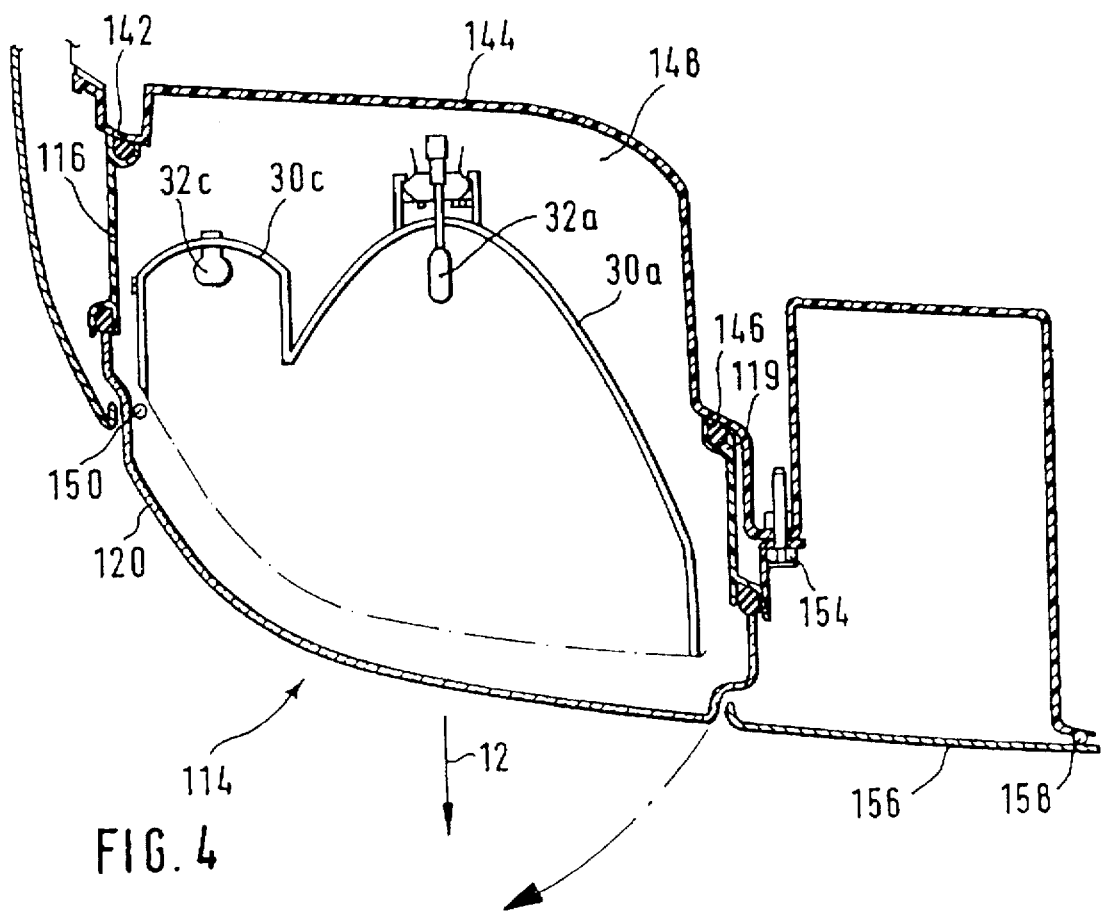
FIG. 4 is a view showing the illumination device in a horizontal longitudinal section in accordance with a second embodiment of the invention.

At least one reflector 30 is supported in the housing part 16, and at least one light source 32 is inserted in the reflector. The light source 32 is inserted in the apex region of the reflector 30 from its rear side. The reflector 30 can also have several partial regions. For example, as shown in FIG. 2, an upper partial region 30a is provided for producing a low light beam while a lower partial region 30b is provided for producing a high light beam or fog light beam. Alternatively, or additionally to it, the reflector 30a, as shown in FIG. 4 can be provided with a lateral partial region 30c for producing a fog light beam or high light beam. The lateral partial region 30c can be provided also for another light, in particular a blinking light.

A special light source 32a, 32b, 32c is associated with each partial regions 30a, 30b, 30c. Alternatively, several individual reflectors can be fixedly connected with one another, which, as described hereinabove, are provided for producing a low light beam, a high light beam or a fog light beam or for forming an additional light and each provided with a corresponding light source. The housing part 16 in its rear side is open and has a circumferential edge 19 at its rear side. The housing part 16 extends in a longitudinal direction starting from its front part on which the cover disc 20 is mounted, opposite to the traveling direction 12. The circumferential edge 19 extends in a plane which can be located perpendicular to the traveling direction 12 or can be arranged inclined to it in a vertical direction and/or in horizontal direction.

The support of the reflector 30 on the housing part 16 is performed in a known manner and therefore not shown and described in detail. The reflector 30 is moveable in a known manner relative to the housing part 16 for its adjustment. In particular it is turnable about a substantially horizontal and/or substantially vertical axis. For an adjustment of the reflector 30, known adjusting devices are utilized which are actuatable from outside of the housing part 16.

The front part 10 has a portion 40 with a circumferential, substantially flat edge 42 facing the traveling direction 20 and with a depression or recess facing opposite to the traveling direction and surrounded by the edge 42. When the headlight 14 is mounted on the front part 10 the circumferential edge 19 of the housing part 16 facing opposite to the traveling direction 12 abuts against the edge 42 of the portion 40 of the front part and the apex of the reflector 30 as well as the light source 32 extend into the depression. An arresting sealing element 46 is arranged between the housing part 16 and the edge 42. A closed chamber 48 is limited by the housing part 16, the cover disc 20 and the wall 44. The reflector 30 with the light source 32 is therefore protected from dirt and moisture.

Figure 3:
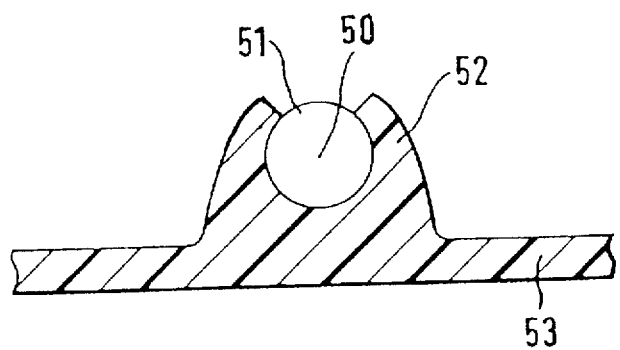
FIG. 3 is a view showing a portion of the illumination device of FIG. 2 identified with III on an enlarged scale.

The housing part 16 is supported in its lower edge region turnably on the front part 10 about a substantially horizontally extending axis 50. One part of the element for forming the turning axis 50 is arranged on the housing part 16 while another part of the element forming the turning axis 50 is arranged on the front part. For example, as shown in FIG. 3, two bearing pins 51 are formed on the housing part 16 at a distance from one another. Only one bearing pin is shown in FIG. 3 which engage in the bearing block 52 of the front part 10. The bearing blocks 52 are arranged on a wall 53 which extends under the edge 42 of the portion 40 of the front part and face in the traveling direction 12. They can be formed of one piece with the wall. The arrangement of the bearing pins 51 and the bearing blocks 52 can be naturally reversed, so that the bearing pins are arranged on the front part 10 and the bearing blocks are arranged on the housing part 16. The turning axis 50 is arranged in the longitudinal direction or in other words as seen in the traveling direction 12, between the front edge of the housing 16 and the rear side of the housing 16 abutting against the edge of the portion 40 of the front part.

The housing part 16 on its upper edge located opposite to the turning axis 50 is mounted on the front part 10 by a releasable mounting element 54. Known elements such as screws or similar elements can be formed as a mounting element 54. In the embodiment of FIG. 2 is formed with an arresting hook which engages on the front part 10 radially to the turning axis 50 and has a mounting portion with which the arresting hook 54 can be released from an arresting. When the mounting element 54 is applied, the housing part 16 is fixed on the front part 10 and pressed against the edge 42 of the portion 40 of the front part. After releasing of the mounting element 54, the housing part 16 is turned with its upper edge region in the traveling direction 12 from the portion 40 of the front part in direction of the arrow 55. Then the light source 32a becomes accessible for exchange through the open rear side of the housing part 16.

A closing part formed as a service flap is arranged on the front part 10 or on the chassis 28. The mounting element 54 as well as a gap eventually provided between the headlight 14 and the front part 10 is at least partially covered by the service flap. The service flap 56 is arranged above the headlight 14 and for example is supported in its upper edge region turnably about a substantially horizontally extending axis 58 on the chassis 28. In the position shown in FIG. 2, the service flap 56 extends over the edge 22 of the cover disc 20 to its main region 21 so that the mounting element 54 is not visible and not accessible. The service flap 56 is turnable with its lower edge region about the axis 58 in the traveling direction 12 back from the headlight 14 to a position, in which the mounting element 54 is accessible and can be mounted or released.

The illumination 114 in accordance with the second embodiment is shown in FIG. 4. It is also formed as a headlight. The headlight 114 has a housing part 116 and a cover disc 120 mounted on it. At least one reflector 30 is supported on the housing part 116 and at least one light source 32 is inserted in the reflector from its rear side. The housing 116 abuts with the circumferential edge 119 of its upper rear side over the sealing element 146 of the circumferential edge 142 of the portion 140 of the front part. Therefore, a chamber 148 is formed which receives the reflector 30 and the light source 32 and is enclosed by the cover disc 120, the housing part 116 as well as the front portion 140 of the front part with the wall 144. The chamber 148 limits the depression. In deviation from the first embodiment, the housing part 116 is supported on the front part 110 turnably about a substantially vertical axis 150 arranged in its lateral edge region. As in the first embodiment, one part of the element for forming the turning axis 150 is arranged on the housing part 116 and another part of this element is arranged on the front part 110. The turning axis 150 is arranged near the outer edge region of the front part 110. The housing part 116 is releasably mountable on its lateral edge region opposite to the edge region of the front part 110 by at least one mounting element 154. The closing part 156 formed as a surface flap is arranged on the inner lateral edge region of the housing part 116. In the position shown in FIG. 4 it extends to the main region 121 of the cover disc 120 and covers the mounting element 154. The service flap 156 is removable so that the mounting element 154 becomes accessible for its mounting and releasing. The service flap 156 can be completely removed or for example can be supported turnably on its lateral edge region opposite to the mounting element 154 about a substantially vertically extending axis 158. The service flap 156 can be a part of the front part 110 or the chassis.

It will be understood that each of the elements described above, or two or more together, may also find a useful application in other types of constructions differing from the types described above.

While the invention has been illustrated and described as embodied in an illumination device arranged in front part of vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An illumination device assembly mounted on a vehicle, comprising a vehicle front part having a front part portion; and an illumination device including at least one reflector, at least one light source, a housing part at least partially surrounding said at least one reflector and said at least one light source and having a front side with a light outlet opening, and a light permeable cover disc connecting to said front side and closing said light outlet opening, said housing part being frame-shaped and having a rear side located opposite to said disc and being open, and said open rear side of said housing part having a circumferential edge which, when said housing part is mounted on said front part portion, comes to abutment against said front part portion of the vehicle, said front part portion provided with a wall located inside said circumferential edge of said housing part, and a closed chamber is formed by said housing part, said cover disc and said wall, and no additional closing part is needed to close said open rear side of said housing part, said at least one reflector and said at least one light source being arranged in said chamber.

2. An illumination device assembly mounted on a vehicle, comprising a vehicle front part having a front part portion; and an illumination device including at least one reflector, at least one light source, a housing part at least partially surrounding said at least one reflector and said at least one light source and having a front side with a light outlet opening, and a light permeable cover disc connecting to said front side and closing said light outlet opening, said housing part being frame-shaped and having a rear side located opposite to said disc and being open, and said open rear side of said housing part having a circumferential edge which, when said housing part is mounted on said front part portion, comes to abutment against said front part portion of the vehicle, said front part portion being provided with a wall located inside said circumferential edge of said housing part, so that a closed chamber is formed by said housing part, said cover disc and said wall, and no additional closing part is needed to close said open rear side of said housing part, said at least one reflector and said at least one light source being arranged in said chamber, said front part portion having a circumferential edge against which said circumferential edge of said open rear side of said housing part abuts, said wall having a depression facing away from an apex of said at least one reflector so that said apex of said reflector and said at least one light source inserted in said reflector extend into said depression when said housing part is mounted on said vehicle front part.

3. An illumination device assembly mounted on a vehicle, comprising a vehicle front part having a front part portion; and an illumination device including at least one reflector, at least one light source, a housing part at least partially surrounding said at least one reflector and said at least one light source and having a front side with a light outlet opening, and a light permeable cover disc connecting to said front side and closing said light outlet opening, said housing part being frame-shaped and having a rear side located opposite to said disc and being open, and said open rear side of said housing part having a circumferential edge which, when said housing part is mounted on said front part portion, comes to abutment against said front part portion of the vehicle, said front part portion being provided with a wall located inside said circumferential edge of said housing part, so that a closed chamber is formed by said housing part, said cover disc and said wall, and no additional closing part is needed to close said open rear side of said housing part, said at least one reflector and said at least one light source being arranged in said chamber; said front part portion having a circumferential edge against which said circumferential edge of said open rear side of said housing part abuts, and an elastic sealing element arranged between said circumferential edges of said open rear side of said housing part and said front part portion.

4. An illumination device assembly mounted on a vehicle, comprising a vehicle front part having a front part portion; and an illumination device including at least one reflector, at least one light source, a housing part at least partially surrounding said at least one reflector and said at least one light source and having a front side with a light outlet opening, and a light permeable cover disc closing said light outlet opening, said housing part being frame-shaped and having a rear side located opposite to said disc and being open, and said open rear side of said housing part having a circumferential edge which, when said housing part is mounted on said front part portion, comes to abutment against said front part portion, said front part portion being provided with a wall located inside said circumferential edge of said housing part, so that a closed chamber is formed by said housing part, said cover disc and said wall, said at least one reflector and said at least one light source being arranged in said chamber, said housing part being turnably supported on an edge region of said front part portion by at least one releasble mounting element arranged eccentrically relative to a turning axis so that when said mounting element is applied said housing part buts against said front part portion, and when said mounting element is released, said housing part is turnable about said turning axis from said front part portion so that said at least one light source becomes accessible.

5. An illumination device assembly as defined in claim 4, wherein said housing part is turnably supported about said axis which is substantially perpendicular to a traveling direction of the vehicle.

6. An illumination device assembly as defined in claim 4; and further comprising a releasable closing part arranged on said front part so as to cover said at least one releasable mounting element, said closing part being at least partially removable so as to make accessible said at least one releasable mounting element.

* * * * *